United States Patent [19]

Bookout

[11] 4,354,614

[45] Oct. 19, 1982

[54] CAN AND BOTTLE VENDING

[75] Inventor: Floyd V. Bookout, Arlington Heights, Ill.

[73] Assignee: Rock-Ola Manufacturing Corporation, Chicago, Ill.

[21] Appl. No.: 199,011

[22] Filed: Oct. 20, 1980

[51] Int. Cl.³ .............................................. B65G 59/06
[52] U.S. Cl. ....................................... 221/67; 221/290
[58] Field of Search ............... 221/125, 126, 129, 289, 221/290, 299, 301, 67, 112

[56] References Cited

U.S. PATENT DOCUMENTS 2,493,223  1/1950  Brock ..................................... 221/67
3,283,953  11/1966  Johnson ................................ 221/67
3,799,393  3/1974  Baxendale ............................. 221/67

Primary Examiner—Stanley H. Tollberg
Attorney, Agent, or Firm—McCaleb, Lucas & Brugman

[57] ABSTRACT

A cam driven dispensing structure for coin-operated automatic vending machines in which vertical gravity feed magazines accommodate a plurality of cylindrical articles, varying in diameter and length. A motor driven cyclicly operated dispensing mechanism is disposed beneath each magazine for receiving articles therefrom and for delivering single articles, as selected, to the customer; each dispensing mechanism being equipped to receive articles from one or more vertical stacks thereof stored in overdisposed compartments of the magazine.

5 Claims, 12 Drawing Figures

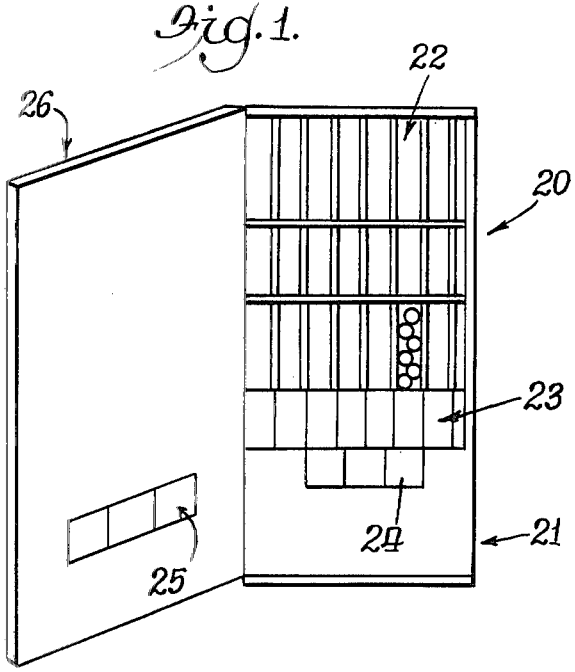
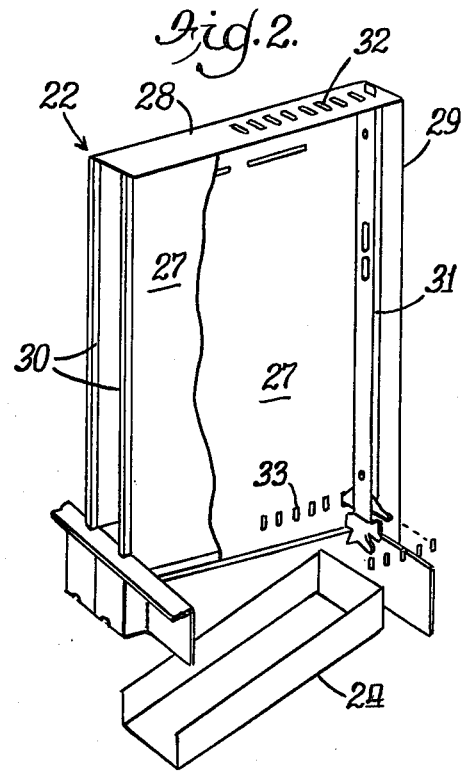
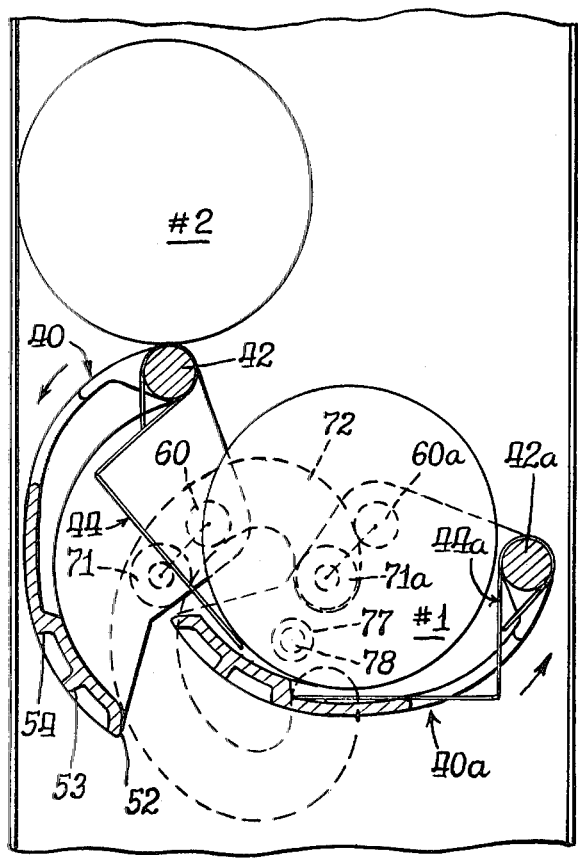
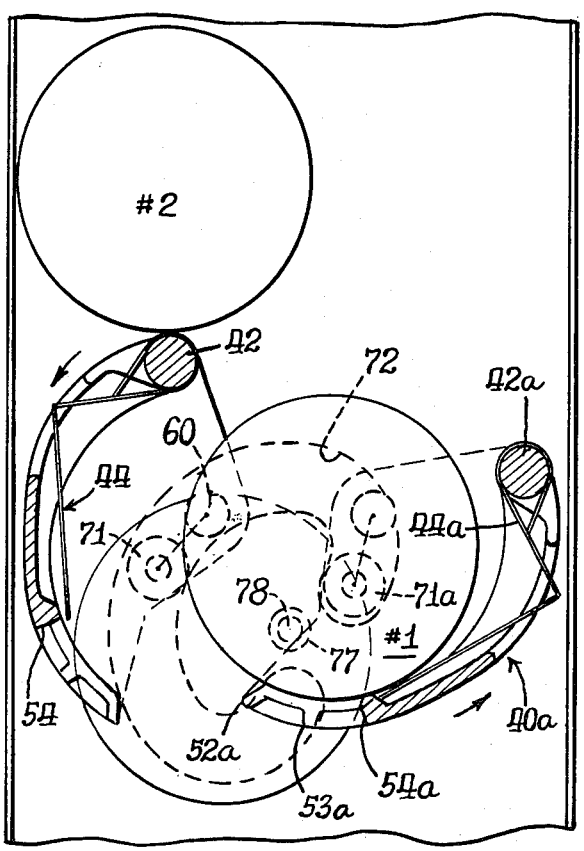

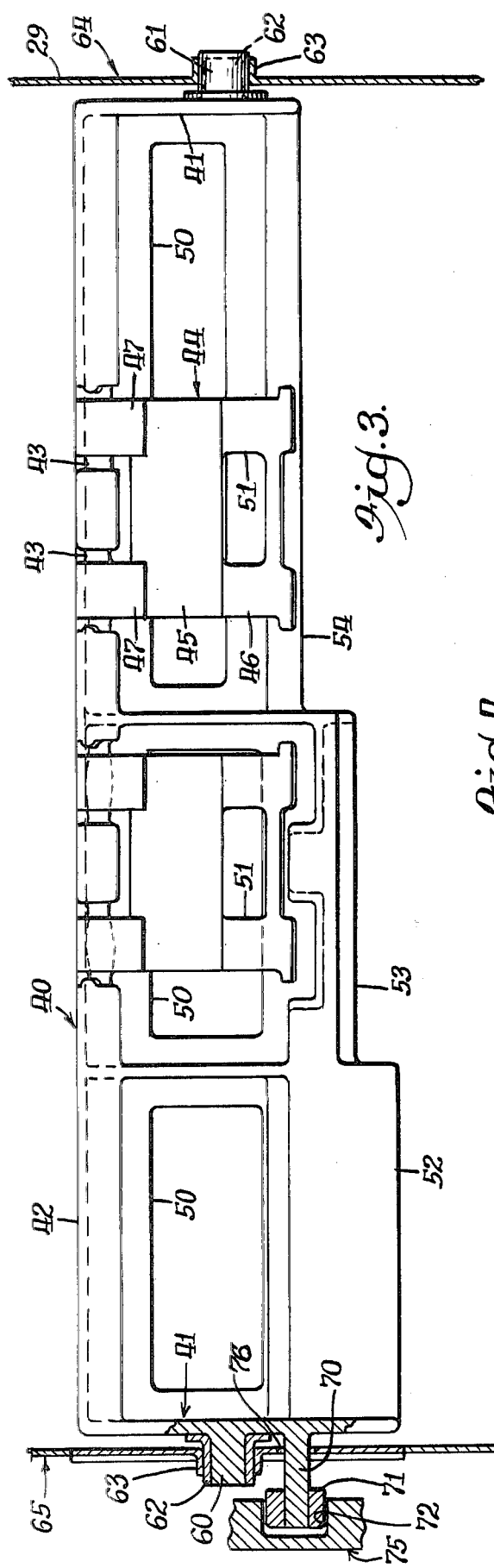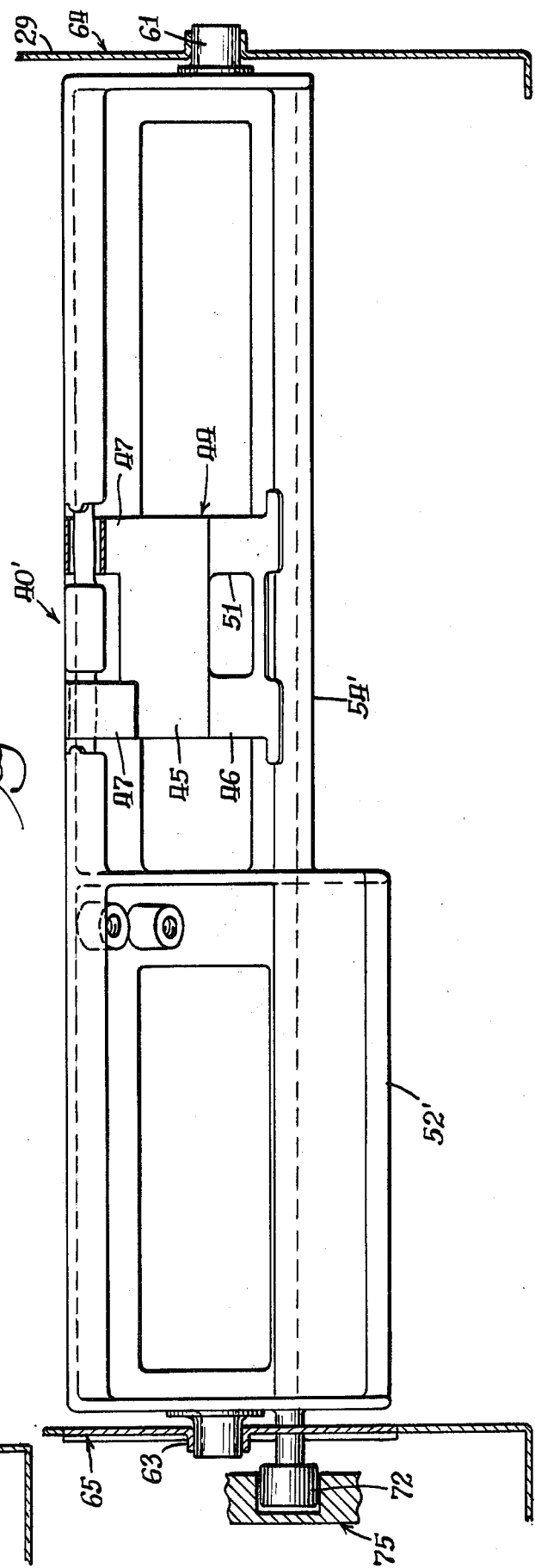

CAN AND BOTTLE VENDING

BACKGROUND OF THE INVENTION

The present invention generally is directed to dispensing of cylindrical articles in an automatic coin controlled vending machine and is particularly adapted for dispensing canned and/or bottled articles.

While machine vending of cylindrical commodities is known the more familiar of such mechanisms are designed to dispense either canned or bottled articles from multiple column magazines. In the usual case, however, the familiar vending machine is designed to dispense either cans or bottles, but not both. Among the more serious problems involved in providing a machine to accommodate both can and/or bottled vending, is that of variation is diameter and length of the cylindrical items. In the main, most efforts in the past have dealt with either the diameter problem or the length problem, but not both in the same dispensing mechanism.

Under current market practice, a variety of canned commodities are dispensed by automatic vending equipment and, depending on their contents, cylindrical articles may vary in diameter approximately three-quarters of an inch, and in length approximately one half inch. As for articles merchandised in bottles, it has been found that the length of the bottles may vary approximately five inches and the diameter approximately three-quarters of an inch. Because of these large size variations there is a need to provide a vending machine for accommodating, not only a wide range of article dimensions, but one which is capable of being supplied with different size articles from a single size supply magazine. It further has become increasingly evident that it is desirable to have a dispensing machanism capable of accommodating both can and bottle vending interchangably.

In considering the dispensing mechanism to be employed with both cans and bottles, it is apparent that the problem of handling both classes of articles in the same dispensing mechanism becomes highly complex unless the articles are substantially of identical size.

One of the more successful attempts to solve the above indicated problems is described in my prior U.S. Pat. No. 3,883,083, issued May 13, 1975 which teaches a magazine capable of accommodating or adapting to cylindrical articles of various lengths and diameters and a dispensing mechanism useful therewith which is capable of dispensing either cans or bottles. In brief, the dispensing mechanism of that patent incorporates elevated bar gates which successively hold and lower cylindrical articles to intermediate escrow chambers from which they are successively released by underlying pivotal vending gates. In practice it has been found that while the mechanism of my aforesaid patent is operably successful and capable of meeting the problems to which the same is directed, such is relatively complicated and relatively expensive to manufacture and maintain.

The present invention is directed to an improved and simplified combination can and/or bottle dispensing mechanism which is distinguished by its simplicity, low cost of production and dependable operational characteristics.

BRIEF SUMMARY OF THE INVENTION

In brief, the dispensing mechanism of this invention is adapted to dispense both cylindrical cans and/or bottles of varying diameter and length; the same being capable of dispensing one or more articles, one-by-one, from an overdisposed storage magazine carrying one or more vertical rows of staggered stacked canned or bottled articles. The present dispensing mechanism is particularly directed to improvements over the convertible article dispensing mechanism taught in my aforesaid U.S. Pat. No. 3,883,038; the same comprising a simplified arrangement of a pair of oscillatably movable dispensing gates driven by a single reversable cam means; each pair of gates comprising a multiple stage member capable of being loaded with one or more articles with each pair of gates cooperating to receive, hold and release articles therefrom one-by-one. The single driving cam for each pair of gates in turn is reversibly driven by motorized drive means, capable of selected periodic movements for effecting controlled intermittent oscillating movement of the dispensing gates.

It is an important object of this invention to provide improved means for dispensing cylindrical cans and/or bottles in a coin controlled vending machine.

It is another important object of this invention to provide an improved dispensing means of simple construction which is particularly capable of receiving cylindrical articles from multiple overdisposed storage means and releasing the same one by one.

Another important object of this invention is to provide improved dispensing means for receiving cylindrical articles from one or more overdisposed stacks thereof.

A still further and important object of this invention is to provide an improved dispensing mechanism for use in dispensing canned or bottled articles in an automatic coin-operated vending machine and which is particularly economical to manufacture and maintain while exhibiting improved operational characteristics.

Having thus described this invention, the above and further object features and advantages thereof will appear to those familiar with this art from the following detailed description of a preferred embodiment thereof, illustrated in the accompanying drawings and constituting the best mode presently known for enabling those familiar with the art to understand and practice this invention.

DESCRIPTION OF THE DRAWINGS

FIG. 1 is a perspective view of a combination can and/or bottle vending machine useful with this invention and showing the arrangement of multiple storage magazines;

FIG. 2 is a partial perspective view, demonstrating the compartmenting features of a storage magazine useful with the current invention;

FIG. 3 is a view in side elevation of a vending gate in accordance with this invention;

FIG. 4 is a view in side elevation of a modified vend gate of this invention;

FIGS. 7 through 12 comprise successive operational end views of a pair of cooperating vend gates and cam means showing the operational sequencing of the same for receiving and releasing articles.

DESCRIPTION OF THE PREFERRED EMBODIMENT

Figure 5:
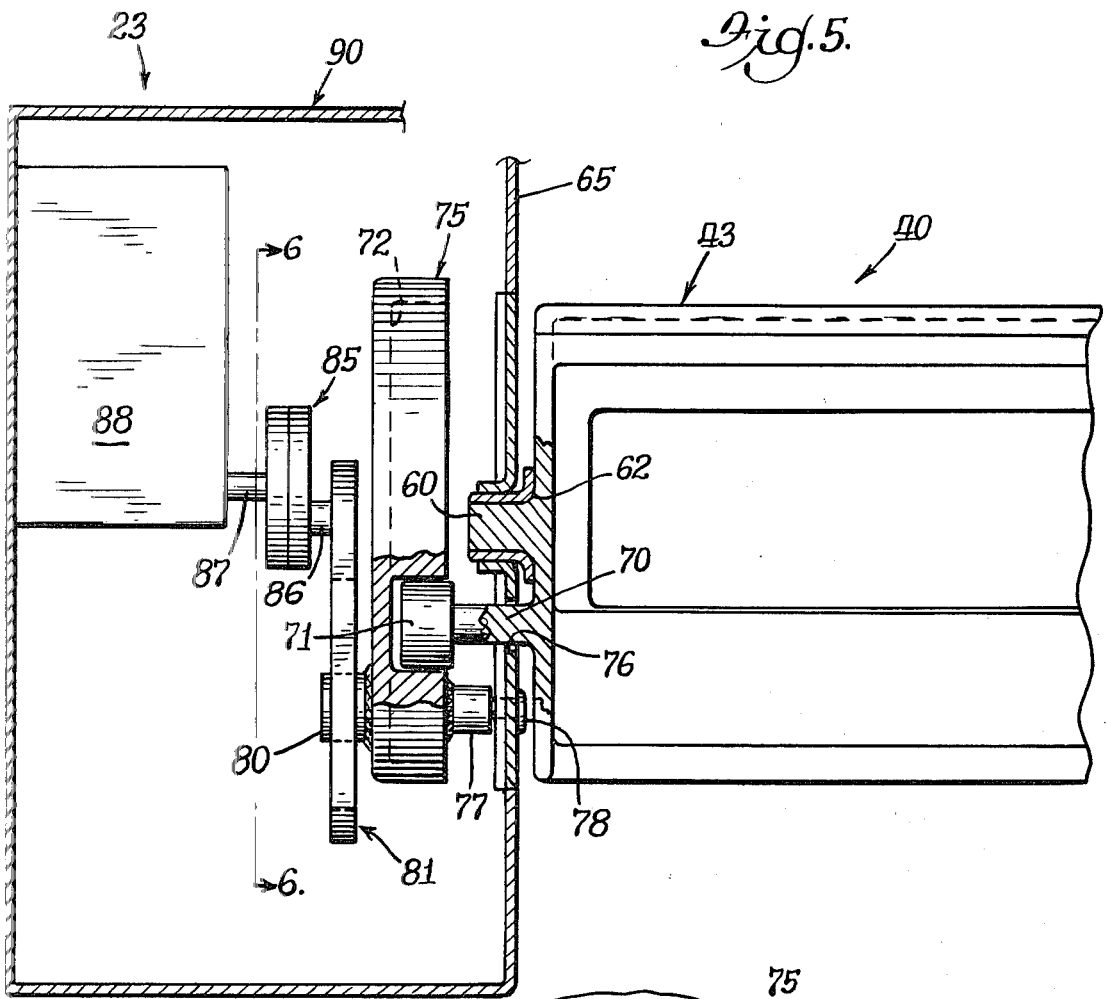
FIG. 5 is a partial elevational view of a drive means for driving a pair of gates of the order shown in FIG. 3.

Turning now to the details of the exemplary embodiment of the present invention illustrated in the drawings, FIG. 1 shows a typical vending machine 20 for dispensing cylindrical articles, such as cans and bottles, after deposit of a specified coin value, in accordance with familiar practice. Machine 20 comprises an insulated cabinet 21 having a hollow interior which accomodates a plurality of vertically upright storage magazine means 22. Cylindrical articles from each magazine means are released to and by underdisposed dispensing mechanims driven by individual motor units 23 for delivery to a discharge chute 24; the delivery chute being available to the customer via opening 25 in a front wall door panel 26 of the cabinet 21. Each of the several magazine means 22 accommodates one or more staggered stacks of cylindrical items as generally shown in FIG. 1.

Selector means, (not shown), normally are provided on the front face of the door panel for customer availability so that a selected commodity may be dispensed in accordance with the deposit of preselected coin values. As an example, a selector system of the order set out in my prior U.S. Pat. No. 3,628,643, issued Dec. 21, 1971 may be used for this purpose.

Those familiar with this art will understand that a vending machine of the order indicated, operably vends items in reponse to customer coin deposit and item selection and, in the particular illustrated case, either canned or bottled commodities may be vended from any one storage magazine.

Inasmuch as the improved dispensing mechanism of this invention is designed to vend individual commodities from one or more vertical stacks disposed in the overhead storage magazine means 22, it is essential that the latter be capable of such functioning. Magazine means of that order is generally taught in my above-referred to U.S. Pat. No. 3,883,038.

In general such comprises an upright rectangular shaped cubical enclosed by parallel side walls 27, 27, top wall 28 and rear end wall 29. An open front is defined by and between parallel spaced rails 30, 30 and an open bottom thereof communicates directly with an underlying dispensing mechanism of this invention, as will be described hereinafter. Internally the compartment enclosed by the magazine walls is characterized by at least one movable separator means 31, as shown in FIG. 2. This separator means is capable of being selectively positioned in a plurality of front to back locations within the magazine as determined by locating slots 32 and 33 in the top and side walls of the magazine 22. This permits regulation of the magazine depth according to the number of stacks of canned and/or bottled goods and their varying lengths to be stored therein. For greater details on the structural details of a magazine of this general order reference may be had to my aforesaid U.S. Pat. No. 3,883,038.

Suffice it to say that the magazine means of the order hereinabove referred to is receptive of one or more stacks of cylindrical articles, disposed in vertical staggered array with the lengthwise axis thereof aligned to parallel the side walls of the magazine. If the magazine means is compartmented to accommodate three article stacks then the rearmost stack of articles is loaded first, the intermediate second and the foremost last; all via the open front of the magazine. The staggered arrangement of such articles is as indicated in FIG. 1. Correspondingly, the dispensing mechanism must operate to receive and dispense articles from each of the over disposed stacks thereof for delivery to a discharge chute 24, as indicated in FIG. 2.

FIG. 3 illustrates the features of one of a pair of vend gates according to the present invention; the particular illustration being that of a left-hand gate 40 with the right-hand gate (not illustrated in elevation) being opposite thereto. Each vend gate is preferably cast or molded from light metal or plastic and generally is a rigid, unified member having a generally arcuate cross-sectional configuration (see FIGS. 7-12). The opposite ends of each gate structure are enclosed by parallel planar end walls 41, 41. The uppermost edge 42 of the gate is distinguished by a thickened formation of generally cylindrical cross-section along which are formed a plurality of smaller diametered short cylindrical axle sections 43; such axle sections being formed intregally with the gate member 40 to comprise rotatable support for one or more gravitationally movable flapper gates 44.

Each flapper gate 44 is formed with angularly related planar sections 45 and 46 (see FIGS. 3, 7-12) section 45 having U-shaped strap extensions 47, 47 which hook or snap over the spaced axel section 43 to pivotally suspend the flapper in working position.

The main body of each vend gate member is, as previously noted, molded or cast in a semi-arcuate or "clam shell" configuration with the same having one or more weight reducing limber holes 50 of generally rectangular formation along its length. In practice, one of the flapper gates 44 is normally disposed opposite each of the limber holes 50. It further will be noted from FIG. 3 that the lower and angularly outwardly extending body portion 46 of each flapper gate is also provided with a limber opening 51 and that the operational position for such a flapper gate is generally within the central confines of its associated vend gate, for reason to appear hereinafter.

The lower edge portion of each vend gate is distinguished by one or more lengthwise stepped sections, depending on the number of articles to be accommodated therein. In the particular illustrated case of FIG. 3, there are three such steps 52, 53 and 54 particularly characterized by downwardly turned lip portions. From FIGS. 7-12, it will be noted that the steps 52, 53 and 54 are disposed at different arcuate distances from the top edge portion 42 of the clam shell gate; each such step constituting a release area for a single article to be dispensed. As illustrated in FIG. 3, since the gate 40 therein shown has a three step configuration, such is designed to accommodate three cylindrical articles. It will be understood that the lengthwise dimension of each of the stepped portions 52-54 is determined by the maximum length of articles to be released therepast. For example, if the gate is designed to accommodate three twelve-ounce cans, each of the steps would have a lengthwise dimension in accordance with the normal twelve-ounce can plus slight longitudinal clearance.

In FIG. 4, a modified gate 40' includes only two steps 52' and 54' and, as such it is particularly suited to vend one longer article, fitting the increased length of section 54', or two shorter items of equal length. Otherwise the features of gate 40' are the same as for the described gate 40.

The outer end walls 41 and 42 of each vend gate are distinguished by outwardly extending co-axial, cylindrical boss portions constituting pivot centers 60, and 61, which are covered with plastic bearing bushings 62 received in extruded boss openings 63 formed in a back plate 64 and a front cover plate 65 mounted below the level of the magazine means. It will be understood that a cooperating pair of gates; i.e. a left hand gate 40 and its reverse right hand counterpart 40' are supported for rotational movement on parallel horizontal axes between the plates 64 and 65 defined by their pivot bosses 60, 61.

In addition to the extending pivot bosses 60 and 61, the front wall 41 of each gate is distinguished by a forwardly projecting cylindrical stub shaft 70 having a rotatable cam follower wheel 71 mounted over its outer end and which is receptive in a cam channel 72 of an operating cam member 75, as will be described more fully presently.

It will be recognized that the cam follower stub shaft 70 extends through the plate 65 and more particularly is disposed in a semi-circular slot 76 having an arcuate extent of substantially 90-degrees (see FIG. 3). This arrangement permits oscillating activity of each of the vend gates in response to reverse rotatable oscillation of the driving cam member 75, as will be described in greater detail presently.

Figure 6:
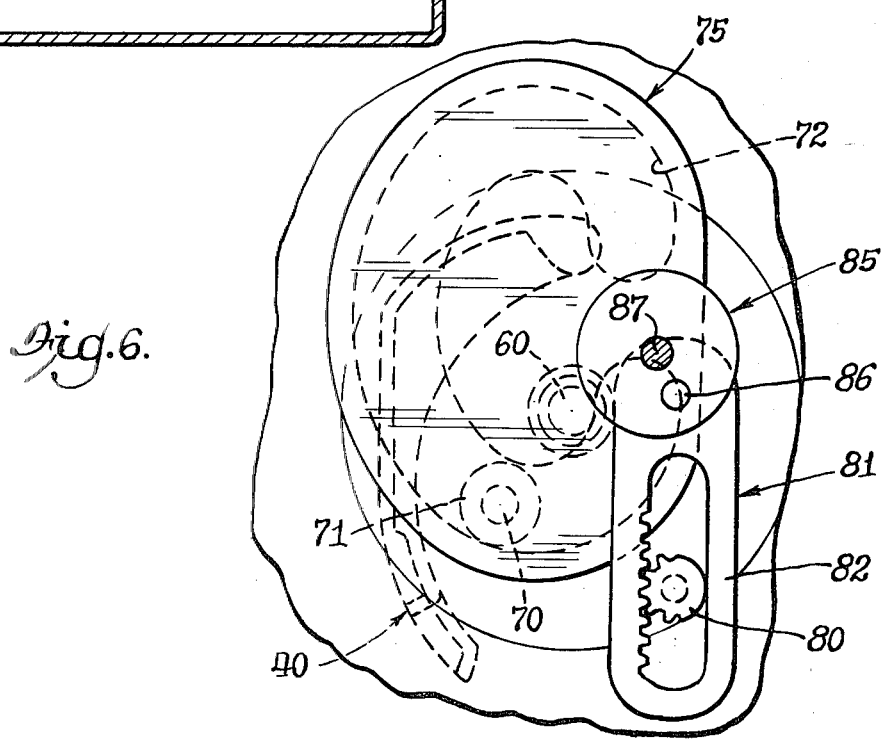
FIG. 6 is a partial cross sectional view of the drive means taken at line 6—6 in FIG. 5.

As shown in FIGS. 5 and 6 mounted forwardly of each pair of vend gates and more particularly outwardly of the cover plate 65 supporting the forward ends thereof, is a single actuating cam 75, which, as shown in FIG. 5, is supported over a pivot center defined by a boss 77 projecting outwardly of one face of the cam member. Boss 77 is rotatably mounted on a stub shaft 78 projecting outwardly of the cover plate 65 and is located centrally between the associated pair of vend gates substantially midway between their pivot centers 60 (See FIGS. 7-12). The boss portion 77 preferrably is integrally formed with the cam member 75 as by molding the same from plastic or the like.

Located on the same axis as its pivotal hub or boss member 77, but on the opposite side of the cam member 75 therefrom is a projecting drive pinion 80 formed integrally with the cam member for driving engagement with a linear rack member 81. The cam pinion preferably is formed with teeth on only a portion on its periphery which engage the rack teeth; the rack having a linear arm 82 which rides on the non-toothed periphery of pinion 80 to maintain the rack and pinion in engagement (see FIG. 6).

Outwardly of the rack member 81 are drive means for the cam 75 which, as shown, comprises an eccentric crank 85 pivotally joined to the upper end of the rack member 81, as by pivot means 86. The eccentric member 85 is fixed to a rotatably driven output shaft 87 of motor unit 88. A reduction drive train is incorporated in the motor unit to provide desired rotational speed for the output shaft and eccentric, in the order of 10 RPM, for example.

In this fashion, or by other suitable means, periodic rotational movement of the motor shaft 87 produces rotation of the eccentric which is joined to one end to rack 81. This in turn effects reciprocating oscillating movement of the rack 81, for reversably driving the cam pinion 80 and thus the cam member 75.

It is to be recognized that while a particular drive means has been described, other arrangements obviously may be resorted to produce the necessary reversable oscillating activity of the cam means 75 whereby to carry out that necessary function in accordance with the present invention. In general the motor means 88 is protectively encased in a housing 90 which is hung on the face plate 65 at the front end of the vending machine as illustrated in FIG. 1. It is intended that the motor and drive means be detachably mounted to the face of the machine as a replaceable unit; with the innerconnection between the drive means and the vending gates being effected by the coupling of the cam hub 77 to its related stub shaft 78.

From the foregoing description of the drive means, it will be understood that in response to rotational activity of the motor shaft 87, cam member 75 is reversably oscillated in an arcuate pattern to effect corresponding reversible arcuate activity of the two vend gates which are coupled to the track 72 of the cam means via followers 71. Schematic representations of the vend gate movement and the corresponding movement of the cam means 75 are set forth in FIGS. 7-12 of the drawings, as will now be described.

As illustrated in the operational FIGS. 7-12, cross-sectional representations of the left and right-hand vend gates are shown in cooperating alignment with the magazine means having its side wall portion 27, 27 shown in cross-section. Views of FIGS. 7-12 are taken from the inside of the magazine looking toward the forward end of the machine.

By way of illustration, a plurality of cylindrical items such as twelve ounce beverage cans are stacked in staggered array between the walls 27, 27 of a magazine 22 in accordance with the illustration set out in FIG. 1. The dispensing mechanism of this invention receives articles from the overhead stacks and releases the same to the customer on-by-one.

FIG. 7 illustrates a pair of vend gates 40, 40a in an initial load position wherein the right hand vend gate 40a is in receiving position and loaded with the first or bottom can 1 in each of the one or more vertical stacks or arrays of such cans. For example in a three-can gate 40 of the order illustrated in FIG. 3, the first can of each stack will be deposited in its respective section of the right hand vend gate 40a as illustrated in FIG. 7. It will be noted that in this initial load position, the right hand vend gate 40a, as therein illustrated, is disposed substantially horizontal as opposed to the vertical or generally upright position of the left hand vend gate 40. In such condition of the two gates, it further will be noted that the upper edge 42 of the left hand vend gate is positioned contactingly beneath the second can of the article stacks; holding the same from gravitating downwardly into the receiving right hand vend gate 40a. This condition obtains until the right hand vend gate is moved upwardly or counter-clockwise as illustrated in FIG. 8, in response to rotational activity of the driving cam 75. Throughout the counter-clockwise movement of the right hand vend gate, it will be noted that the left hand vend gate 40 maintains its generally vertical upright position so that its upper edge portion 42 holds back the second can in each of the respective stacks for the three section pair of vending gates.

The condition illustrated in FIG. 8 of the drawings is one in which the first can of the loaded vend gate pair is positioned for discharge between the edge portions 54 and 54a of the left and right hand vend gates respectively; the right hand vend gate having been moved, as described, counter-clockwise an appropriate distance to effect the desired gate separation for permitting escape of a single can downwardly into the underlying discharge chute 24 for delivery to the customer. This arcuate movement of the right hand vend gate is substantially 30-degrees from its initial load position, in the illustrated case of FIG. 7. It further will be recognized that the separation of the edge portions 54, 54a may be regulated in accordance with the periodic movement of the driving cam 75 whereby to accommodate various diametered articles. It also will be recognized that the twelve-ounce can of the illustrative case has sufficient clearance to pass between the separated lip portions 54, 54a in the position of the two vend gates as shown in FIG. 8, thus permitting enough clearance to accommodate an even larger size can, say of the order of two and fifteen sixteenth inches in diameter, as occurs with a so-called plastic beverage container.

Once the first can has been discharged from the rearwardmost section of the three-section vend gates, that is the one farthest inward from the front of the machine, upon selection the second vend occurs from the midsection of the two gates. That condition is illustration in FIG. 9 of the drawings. As there shown, vend gate 40a has moved counter-clockwise another substantial 30-degrees of movement effecting a further separation of the intermediate lip portions 53, 53a to permit escape of the can formerly held between the mid-sections of the two vend gates.

Figure 10:
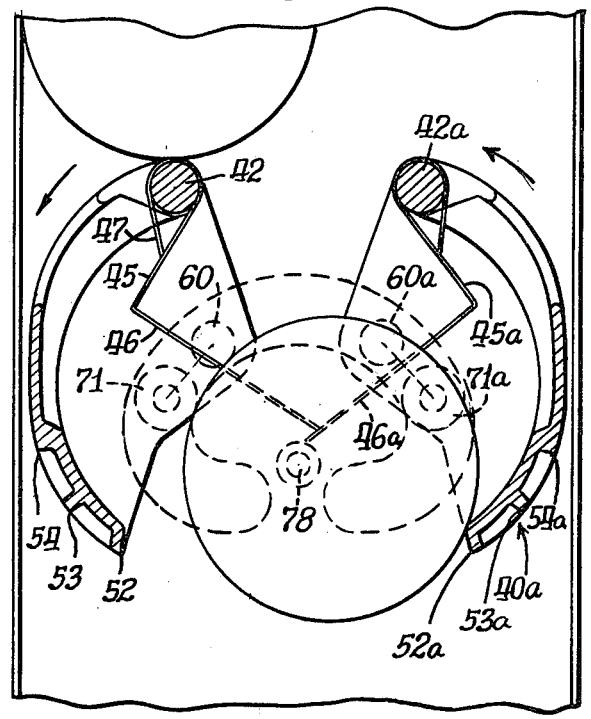

In FIG. 10, the two vend gates are positioned substantially in identical angular positions about their pivotal axes 60, 60a and are aligned generally symetrically of the center line of the magazine, whereby the can in the foremost vend gate section is permitted to escape downardly between the separated leading lip portions 52, 52a. Thus three cans, as initially loaded between the two gates 40, 40a are successively discharged therefrom one-by-one in response to periodic customer selection and deposit of appropriate coin values. This is brought about according to the periodic and limited oscillating movement of the driving cam 75 and the following activity of the vend gates therewith.

Figure 11:
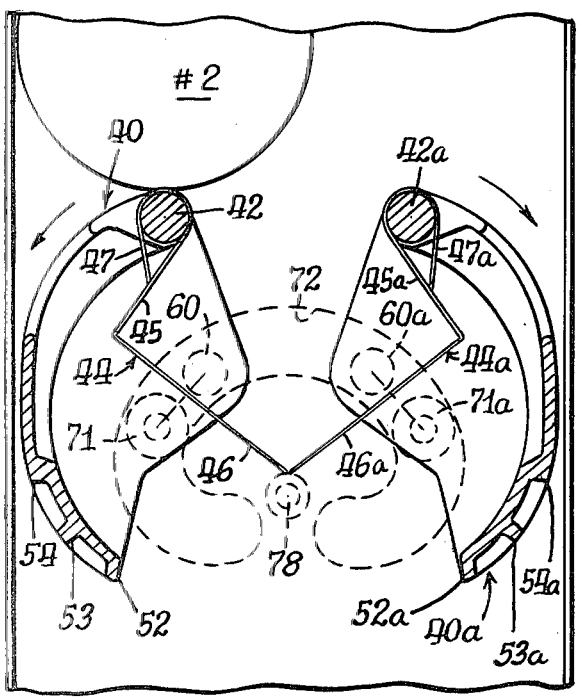

After discharge of the three cans from between the two gates as hereinabove described, the gates pass through a transition period as illustrated in FIG. 11, preparatory to reloading of the gates. In this condition the left hand vend gate 40 approaches counter-clockwise movement as the right hand vend gate 40a reaches a momentary stationary position, at which time both gates are in an upper position as shown in FIG. 11. Meanwhile the left hand vend gate 40 starts its movement downwardly from its FIG. 11 position to its FIG. 12 position, i.e. a load receiving condition, wherein the same lies generally horizontal and the right hand vend gate is disposed generally upright. It is to be noted that in load receiving position, the gate receiving the cans underlies the pivotal axis of the upright vend gate. It will be noted also that as the left hand vend gate 40 lowers from its FIG. 11 position to its load receiving FIG. 12 position, the overlying second cans of the overdisposed stacks, formerly held against and by upper the edge portion 42 of the formerly upright gate 40 are gradually lowered with that vend gate and deposited within and between the two vend gates, ready for a repeat of the discharge cycling as heretofore described. This activity departs from the prior art in that at no time is either gate required to work against the weight of the stacks as by attempting to raise the cans when moving from an article holding position (FIG. 11) to an article receiving condition (FIG. 12).

Figure 12:
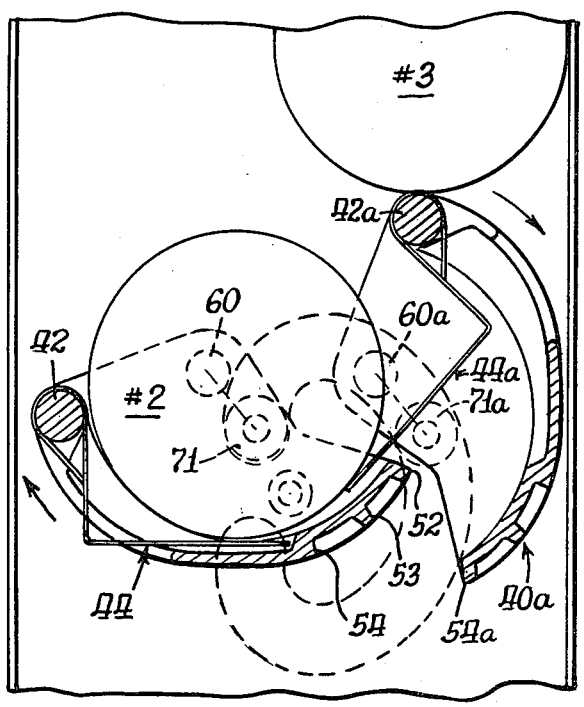

It will be appreciated that during the second cycling of the vend gates, that is, when the second cans of the three arrayed stacks thereover are being discharged, the upper edge 42a of the right hand vend gate 40a is positioned to hold up the third can of each staggered stack which has lowered onto the raised gate as illustrated in FIG. 12. Thus the back and forth cycling of the two vend gates continues until the arrayed stacks thereover are depleted.

Figure 9:
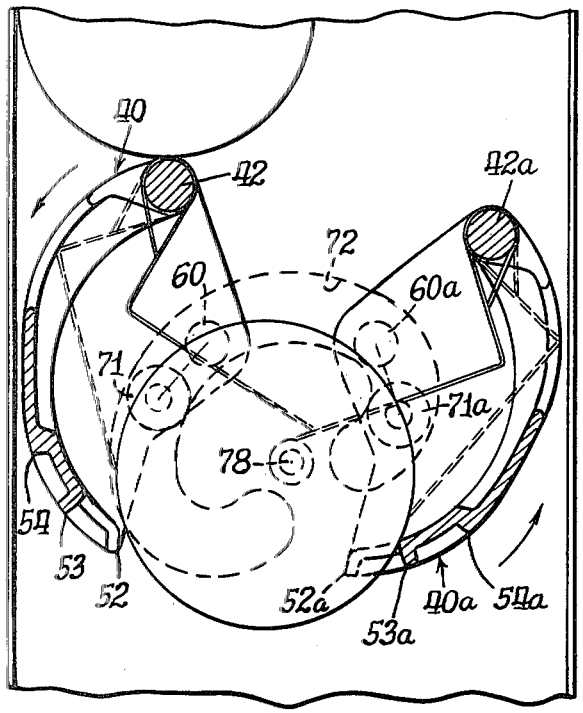

It will be understood that throughout the discharge activity of the two vend gates as described and illustrated of FIGS. 7–12, the gravitational activated safety gates 44 and 44a thereof move from open positions at the loading condition of FIG. 7, for example, to closed positions as each can is dispensed from the gate (see FIG. 9). In the closed condition, as each of the cans is discharged from its respective section of the three-section vend gates, the two safety gates 44 and 44a move across the vend gate chambers as the same are vacated by the discharged cans, thus prevents an unscrupulous customer from reaching upwardly through the discharge chamber for the purpose of dislodging a can from the stack being held by the uppermost vend gate edge, as for example by edge 42, or from an adjacent section of the gate pair. This precautionary measure is necessary to prevent pilfering of the machine.

The sequential showing of the operational positioning of the cam means 75 in accordance with the described loading and vending positioning of the vend gates is also illustrated in FIGS. 7–12. It will be seen from FIG. 7 that the initial loading position of the cam means 75 and more particularly its track 72, is such as to dispose the followers 71 and 71a of the left and right hand vend gates, respectively, in substantially identical positions of angularity relative to their associated pivots 60 and 60a. Generally as shown in FIG. 7, the followers 71 and 71a are thus located at approximately 7 o'clock positions with respect to the pivot centers 60 and 60a. As the cam member 75 is rotated from its FIG. 7 position to arrive at the intitial position for vending the first can from the rearwardmost gate section, in accordance with the positioning of the vend gates set out in FIG. 8, the follower 71 of the left hand vend gate remains substantially as initially positioned whereas the follower 71a of the right hand vend gate has moved counter-clockwise to roughly a 6:30 position. Upon the second discharge movement of the cam means to arrive at its FIG. 9 position, (corresponding to the vend gate position of FIG. 9), follower 71a is now positioned at substantially 5 o'clock whereby to release the second can from the three-section gate pair.

Continued movement of the cam means 75, as by the selection of the third or front can from the three-section vend gate pair, causes the right hand follower 71a to move to a generally 4 o'clock position relative to its pivot center 60 and in this condition the two followers 71 and 71a are disposed generally symetrically of a vertical center line passing through the pivot center 78 of the cam means as shown in FIG. 10. It will be recalled that in this condition, the third can of the three-can section gates, that is, the can closest to the front of the machine, is in a position for release or discharge by the vend gates.

Continued rotation of the cam means 75 to its FIG. 11 position and the reversal thereof to its FIG. 12 position effects the transition and reordering of the vend gates for loading of the left hand vend gate 40 as illustrated in FIG. 12. It will be recognized that during this transition and repositioning cycle, the right hand vend gate follower 71a remains substantially at a 4 o'clock position relative to its pivot center 60a while the left hand vend gate follower 71 assumes the position generally in accordance with its transition position of FIG. 11. The reloaded vend gates are thus reordered for a repeat of the described discharge cycle.

From the foregoing it is believed that those familiar with the art will readily recognize and appreciate the novel aspects of the cooperating pair of vend gates above described along with their simplified arrangement and movement pattern as effected by a single driving cam. This advancement over the art and particularly my former U.S. Pat. No. 3,383,038 provides an effective and simplified means for discharging cylindrical items from a single or multiple stage pair of vending gates of the order described. In this respect it must be recognized that while the description above set forth relates principally to a three-section vend gate pair, the same may constitute a single or additional stage vend gate pair for disposing of articles one by one, as described and that the principles of structure and operation thereof are equally applicable to the vending of bottled articles as well.

The embodiment of the invention in which an exclusive property or privlege in claimed are defined as follows:

1. For use in a coin-operated vending machine for dispensing cylindrical articles from magazine means having one or more vertical open bottom storage compartments, each compartment holding one or more staggered stacks of articles to be dispensed, improved article dispensing means commonly blocking the open bottom of each said compartment and comprising: a pair of elongated vend gates, each having a generally clam shell cross sectional configuration presenting a concave interior receptive of articles from each stack of articles in the compartment thereover; spaced mounting means pivotally supporting said gates for arcuate movement about parallel spaced axes extending lengthwise beneath the bottom of the associated said compartment, single cam means rotatably mounted adjacent one end of said pair of gates, cam follower means mounted on each said gate operatively coupling the same with said cam means, and motorized drive means operable to oscillate said cam means selected distances whereby to periodically and alternately pivot said gates in opposite arcuate directions to thereby sequentially move each thereof to and between substantially horizontal lowered and substantially vertically upright elevated positions, and vice versa; movement of each gate to its elevated position causing the same to undersupport the bottommost article in each staggered stack of articles thereover and movement of each gate from its elevated to its lowered position serving to gradually lower articles undersupported thereby into the concave interior thereof while the other gate of said pair is retained in its elevated position; said motorized means, gates and cam means cooperating during elevation of a lowered gate containing articles to sequentially discharge said articles therefrom one-by-one.

2. The combination of claim 1 wherein said cam means is formed to comprise a closed track configured to maintain one gate of said pair thereof in a substantially static upright position while the other thereof is moved from its lowered position toward its elevated position in a series of interrupted movements, depending on the number of articles therein, each interrupted movement thereof serving to separate said pair of gates sufficiently to release a single article between the bottom opposing edges of said pair of gates.

3. The combination of claim 1 wherein each of said gates is constructed with a longitudinal stepped configuration along the bottom edge thereof, the bottom edge of each step section being disposed at a different arcuate distance from the gate's pivotal axis and the number of step sections conforming to the number of article storage stacks in said magazine compartment thereover whereby opposing step sections of the gate pair receive and discharge articles from one overdisposed stack.

4. The combination of claim 1 wherein each said gate is constructed with a stepped lengthwise configuration along its bottom edge; each step thereof extending a different arcuate distance from the pivot axis of its associated gate and the number of steps conforming to the number of article stacks in an overdisposed magazine compartment; the length of each step substantially conforming to the length of the articles to be handled thereby; the gate pair being assembled so that the bottom edges of corresponding lengthwise steps thereof are in opposing cooperating relationship; and wherein said drive means effects periodic operation of said cam means to separate the cooperating opposed edges of said step sections sufficiently for the discharge of an article therepast, relative movement between the bottom edges of said steps taking place in one or more stages corresponding to the number of vend gate steps provided.

5. The combination of claim 3 wherein said cam means is configured to effectively maintain one of said gates in a substantially upright position while the other thereof is moved arcuately from a generally horizontal article receiving position to a generally vertical position; the movement of said other gate being effected in one or more stages corresponding to the number of steps configured in said gates and the number of stacks to be dispensed; interruption of movement at each stage effecting a separation of a pair of opposing step edges of the gate pair whereby to permit the discharge of an article therebetween.

* * * * *